Figure 5:
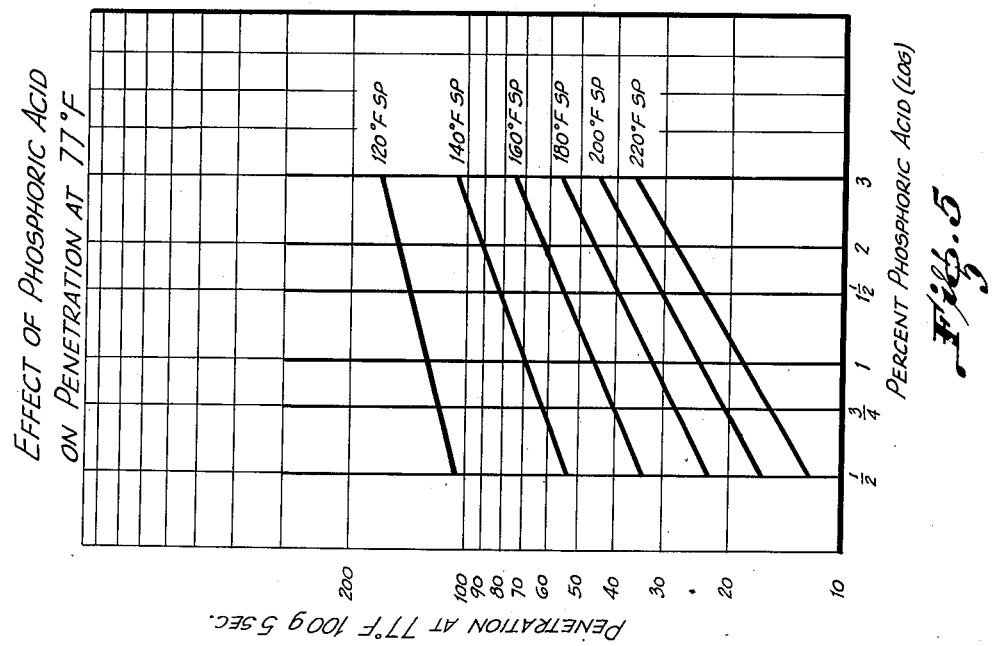

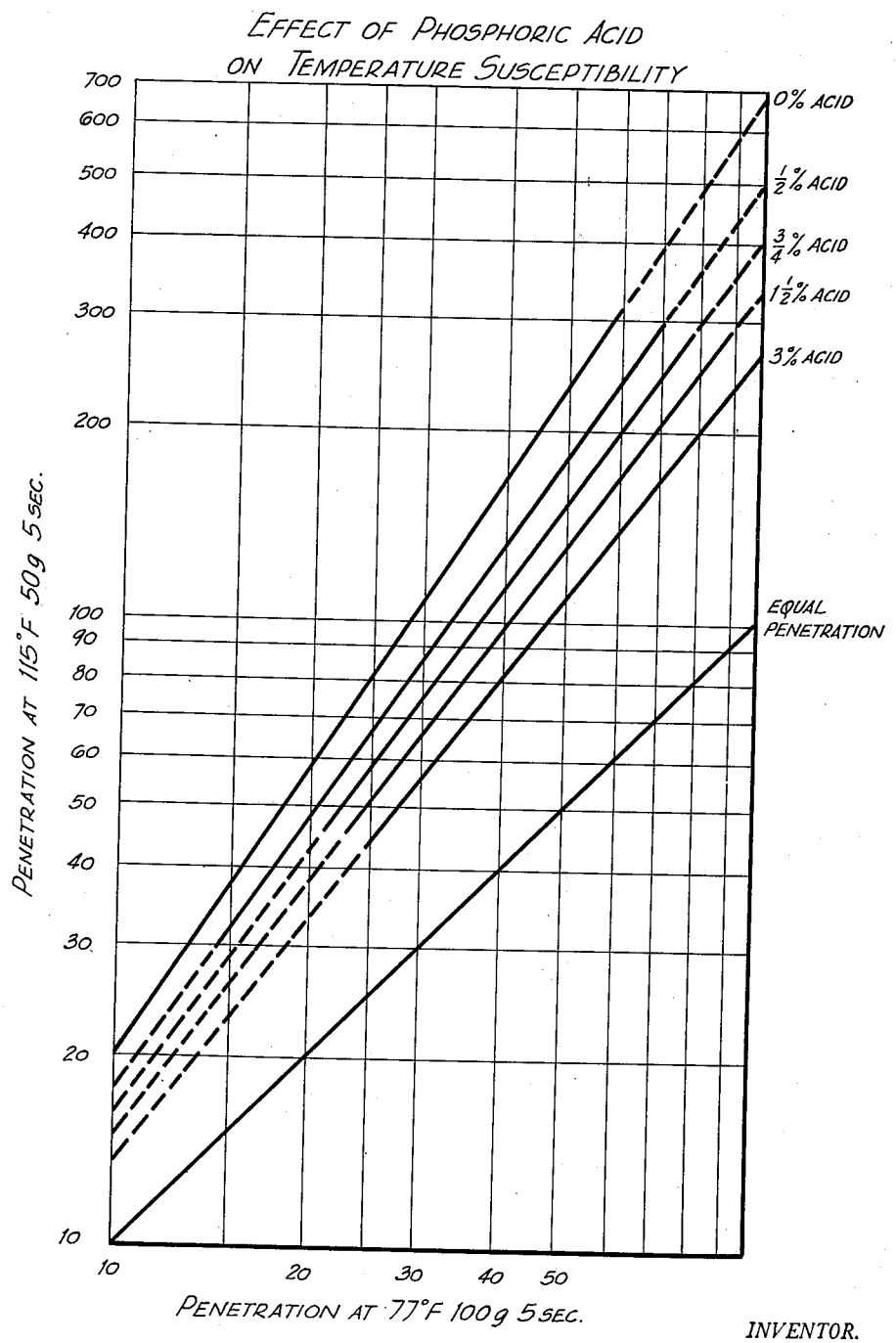

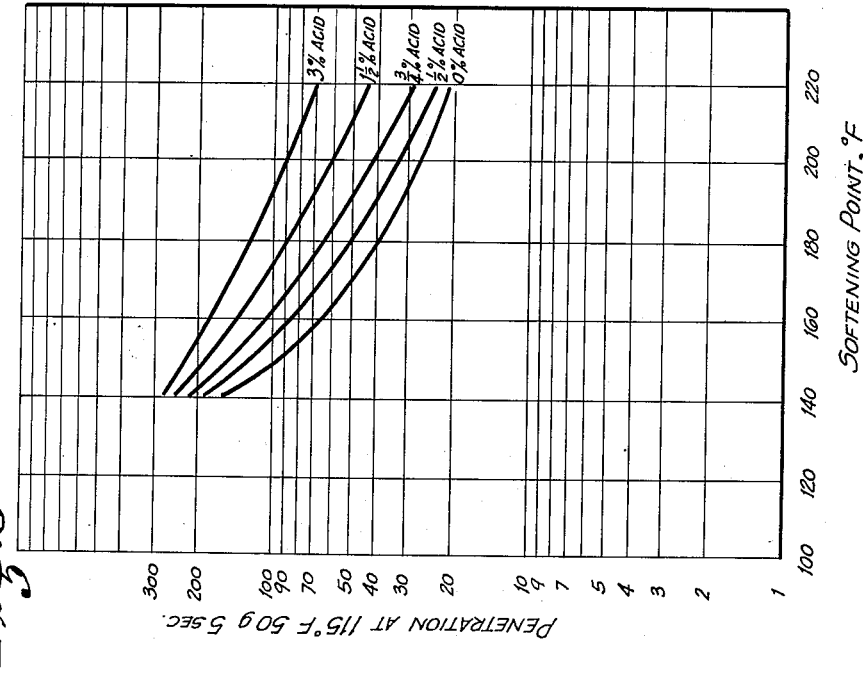
Fig. 2 Effect of Phosphoric Acid on Penetration at 77°F
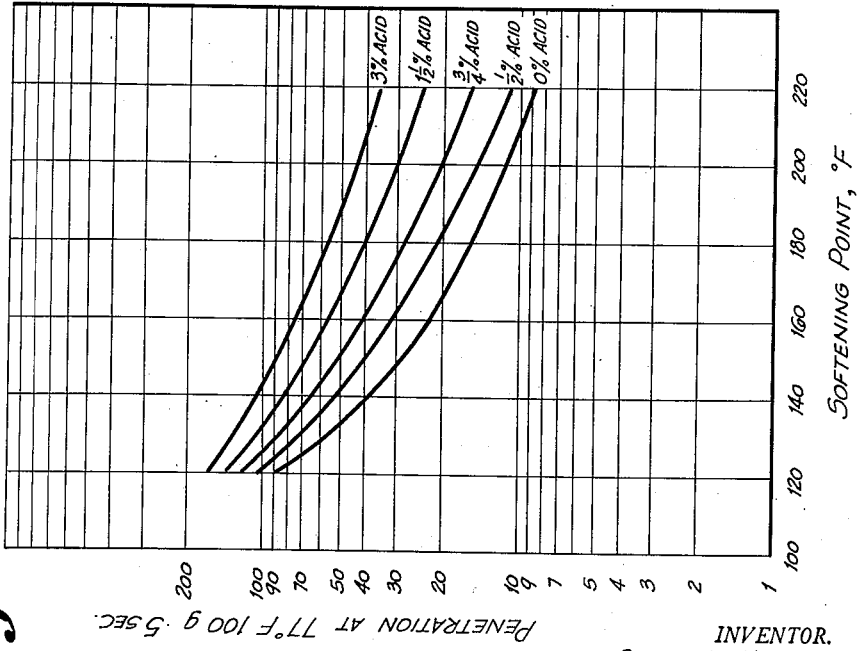
Fig. 3 Effect of Phosphoric Acid on Penetration at 115°F INVENTOR.
ROBERT N. KINNAIRD, JR.
BY
Robert D. Flynn
AGENT

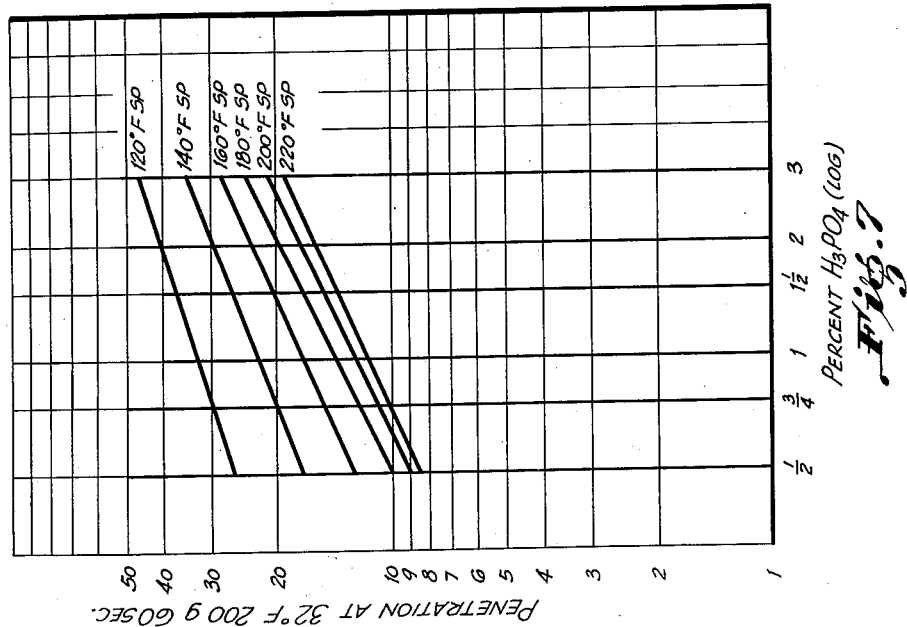
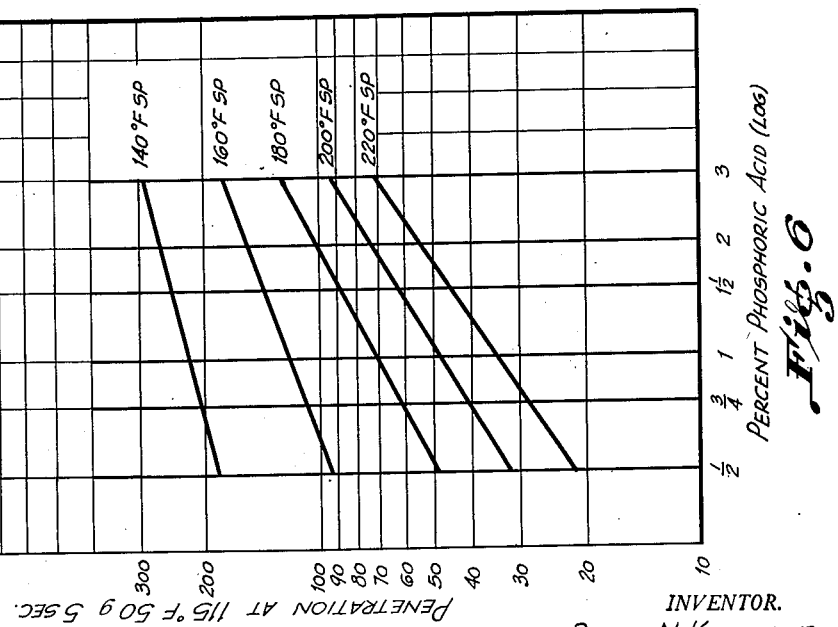

Sept. 11, 1956  R. N. KINNAIRD, JR  2,762,755
ASPHALT AND METHOD OF PREPARATION THEREOF
Filed March 20, 1952  10 Sheets-Sheet 7

INVENTOR.
ROBERT N. KINNAIRD, JR.
BY
AGENT

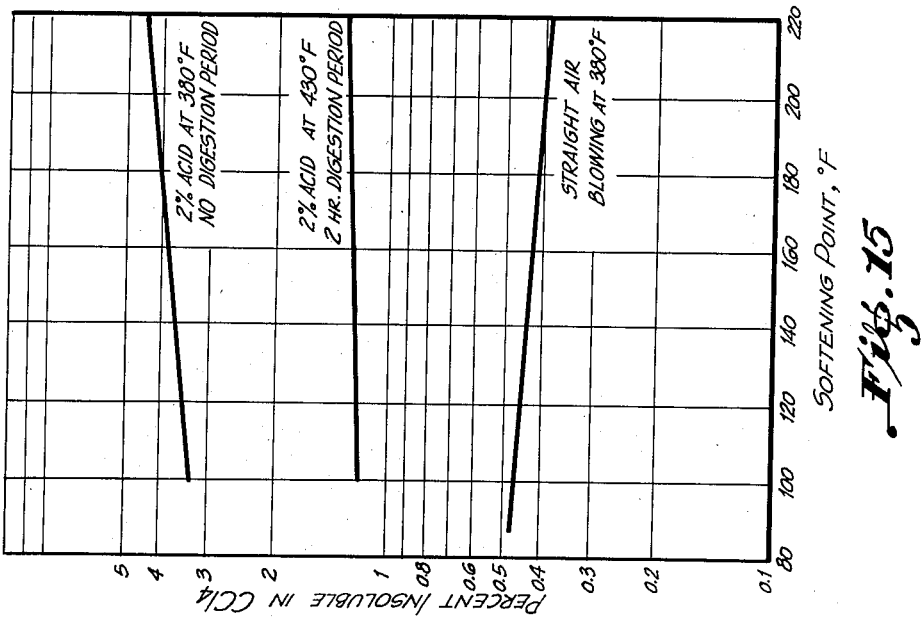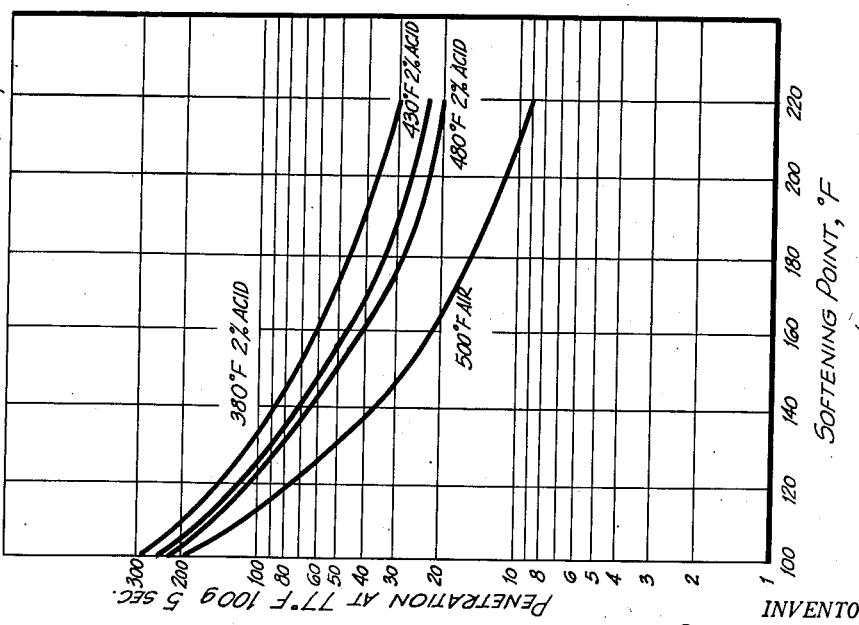

United States Patent Office 2,762,755
Patented Sept. 11, 1956

2,762,755

ASPHALT AND METHOD OF PREPARATION THEREOF

Robert N. Kinnaird, Jr., Yonkers, N. Y., assignor to Socony Mobil Oil Company, Inc., a corporation of New York Application March 20, 1952, Serial No. 277,631

6 Claims. (Cl. 196—74)

This invention has to do with asphalts and with a method for preparing the same.

Asphalts of diverse character have been known in the art for centuries. Naturally-occurring asphalts found early use as protective paints, insulating materials and road pavements. However, while such asphalts may still be so used, they are characterized by certain shortcomings which impose limitations upon their field of application. For example, they are excessively hard and brittle, and have undesirable penetration-softening point charactertistics, all of which serve to eliminate them from applications demanding plasticity. This is also true, but to a lesser extent, with many of the more recently-developed oxidized asphalts. Coatings or materials containing asphalts of the latter type generally do not satisfactorily resist cracking through mechanical stress or impacts or through lowering of ambient temperature.

It is an object of this invention, therefore, to provide an asphalt of excellent plasticity, having outstanding penetration-softening point characteristics. It is also an object to provide an asphalt substantially free from non-asphaltic contaminants, which materials are generally measured by a "carbon tetrachloride insolubles value." It is a further object to provide highly plastic asphalts which are particularly advantageous for waterproofing, culvert coating, revetting of embankments and related applications. Another object is to provide an efficient method for preparing an asphalt of the foregoing character. Other objects and advantages of the invention will be apparent from the following description.

OUTLINE OF INVENTION

It has now been found that outstanding asphalts can be prepared by a particular sequence of operations in which phosphoric acid is used as a catalyst or modifying agent. An asphalt charge stock is in contact with a relatively small amount of phosphoric acid at a relatively low temperature, for example 300° F., for a time interval which is interrelated with the temperature used; thereafter, the charge stock, containing the acid, is oxidized at a higher temperature, for example, 400° F., for a sufficient period of time to produce an asphalt of desired character.

PRIOR ART

It is recognized that catalysts or modifying agents, including phosphoric acid and other phosphorus-containing compounds, have been used before in preparing asphalts. Yet, as made apparent by the following descriptive material, there are a number of fundamental differences between the asphalt products hitherto prepared with such catalysts and the asphalt products prepared under the particular sequential scheme of this invention.

Perhaps the first to use phosphoric acid as a catalyst in preparing asphalts was Lichtenstern, as shown by 1,720,487. Lichtenstern prepared highly elastic or rubber-like asphalts by reacting an asphalt with Chinese wood oil (now known as tung oil), at temperatures up at 300° C. This process, however, produced an infusible material, not suitable for applications of the type contemplated herein.

Another to use phosphoric acid as a catalyst is Burk, as shown by 2,179,208. Here too, the asphalt charge, a residuum, is air-blown immediately; phosphoric acid is added to the air-blown residuum; and the residuum so treated is heated. The asphalt products, as described by Burk, have higher melting points at a given penetration and better susceptibility coefficients, than customary asphalts. These findings have been confirmed. However, in contrast with the process and products described by Burk, the pretreatment of the asphalt charge before oxidation thereof, makes possible products possessing surprisingly higher penetrations for a given melting point. This is borne out hereinafter by data obtained under comparative operating conditions.

More recently, Hoiberg has described—in 2,450,756—a catalytic method for air-blowing asphalts at temperatures within the range of 400–550° F. In this method, the catalyst is a stable phosphorus agent such as phosphorus pentoxide ($P_2O_5$); according to the patentee, phosphoric acid is not stable at the temperatures used in such method. Although the asphalts obtained by the Hoiberg procedure are highly plastic and have certain advantageous features, they too are characterized by at least one serious disadvantage. The finished products so obtained contain excessive amounts of non-asphaltic materials. That is, their "carbon tetrachloride values" are excessively high. Therefore, the products described by Hoiberg are lowered in quality due to the presence of an excess of such foreign material. Data obtained under comparative conditions are provided hereinafter, to demonstrate the great difference obtaining between the process and products described by Hoiberg and those forming the basis for the present invention.

INVENTION IN DETAIL

As indicated above, the particular sequence of operations which make possible realization of the outstanding asphalts of this invention is:

(1) Treating an asphalt charge stock with a relatively small amount of phosphoric acid at a relatively low temperature for a time interval which is interrelated with the temperature used; and (2) Oxidizing the asphalt product, obtained in (1) with a suitable source of oxygen at a higher temperature than used in (1), for a sufficient period of time to produce an asphalt product of desired character.

Asphalt charge stocks

The asphalt charge stocks suitable for use herein can be of varied character. Broadly, any petroleum residuum or flux, remaining following separation therefrom of vaporizable hydrocarbons through lubricating oil fractions, or any relatively high molecular weight extract obtained by petroleum refining, can be used. For example, residua from Pennsylvania, Mid-Continent, Californian, Middle-East, Near East, Venezuelan, etc. crudes can be used. Or, in other words, residua from paraffinic, naphthenic, aromatic, high sulfur, etc. stocks are suitable. It will be recognized, of course, that differences in charge stocks are reflected in differences in the character of the final products contemplated herein, and such differences are indicated below. Typical advantageous charge stocks are a Casper flux having an 85–90° F. softening point, which is representative of a Mid-Continent charge; Lagunillas fluxes having softening points of 70° F. and 120° F., such materials typifying Venezuelan residua charges; a 27% Kuwait residuum having an 85° F. softening point and a 24% Kuwait residuum having a 90° F. softening point, such typifying Near-East charges; a tar having a 95° F. softening point and obtained by a Duo-Sol treat of a heavy lubricating oil, and a tar having a 125° F. softening point and obtained by a Duo-Sol treat of a heavy lubricating oil.

Treatment with phosphoric acid

Initially, the asphalt charge is heated to a relatively low temperature, but one at which the charge has a satisfactory fluid or viscous character. In general, temperatures from about 200° F. to about 350° F., are suitable. Selection of such temperatures is dependent, however, upon the temperature maintained during the treatment with phosphoric acid. Generally, the charge stock is heated above about 200° F., inasmuch as the rate of change induced by the acid is too slow at lower temperatures for practical operation. In the same vein, the charge stock should not be heated above about 350° F. during the acid-treatment; temperatures maintained above about 350° F. for any appreciable time interval appear to be responsible for the formation of excessive "carbon-insolubles" in the product. It is preferred that a temperature of about 300° F. be maintained during the acid-treatment.

Phosphoric acid is added to the heated asphalt charge, while the latter is at the acid-treatment temperature or while the latter is being heated to such temperature. At the same time, the heated charge is agitated or stirred in order to thoroughly distribute the acid therethrough. Agitation may be caused by a mechanical stirring means or, as preferred, by blowing a stream of air or other oxygen-containing gas through the charge. When air or other gas is used to supply agitation to the heated charge, the quantity of air used is kept well below the quantity of air used in the subsequent oxidation step. Generally, the amount of air used to agitate the heated charge during the acid-treatment can be varied from an amount merely sufficient to provide a reasonable measure of agitation to approximately one-half of the air used during the subsequent oxidation.

The phosphoric acid is added over an extended period, rather than added directly in a single application. The acid can be added continuously at a regulated rate or can be added periodically in small portions. A preferred procedure, however, is to add the acid continuously to the vessel containing the heated charge, either through a separate line or in admixture with the air serving as an agitation means.

The time interval during which the acid is added and during which the asphalt charge is in contact with the acid prior to the oxidation operation, is an extended one. In general, this interval will vary from about ½ to about 4 hours. However, as indicated above, this interval is interrelated with the acid-treatment temperature. Thus, for the temperature range of about 200° F. to about 350° F., the time intervals will be regulated from about 2 to about 4 hours with temperatures at the lower end of the temperature range, and from about ½ to about 2 hours with temperatures at the uper end of the temperature range. Preferred operating temperatures of about 300° F. are maintained for an acid-treatment time interval of about two hours.

With regard to the quantity of phosphoric acid used, this can be varied from about 1/10 to about 10 per cent, by weight of the asphalt charge stock. It will be recognized that the quantity of acid used will be dependent upon the nature or character of the charge stock. For example, quantities at the upper end of the foregoing precentage range, as 4 to 5 per cent, are generally used with Duo-Sol tars; whereas, in contrast, quantities at the lower end of the percentage range, as ½ to 1 per cent, are used with Kuwait residua. As a general rule, however, advantageous results are obtained with about one to three per cent of acid. These percentage figures are based upon 85% phosphoric acid and, of course, correction must be made when phosphoric acid of different strengths are used. A convenient and readily available source of the acid is a 75 per cent aqueous solution.

As indicated earlier, agitation of the heated asphalt can be accomplished by blowing a stream of oxygen or air therethrough. In asmuch as oxygen or air is used in the subsequent oxidation or blowing operation, it is most convenient to use either or both of these gases at a reduced flow rate, in order to provide agitation, and thereafter increase the flow rate to provide the desired oxidation. It will be apparent, however, that any other suitable gaseous material can be used for agitation purposes. Representative of such gases are nitrogen and carbon dioxide.

Oxidation of acid-treated asphalt charge

After the acid treatment of the asphalt charge has been completed, air or oxygen is blown through the heated charge at an increased rate and the temperature is increased. In this oxidation operation, the amount of air or oxygen used and the rate of flow thereof, can be those customarily used in the blowing of asphalts. However, inasmuch as the temperatures used in the blowing operation are lower than those customarily used, it is recommended that a slight excess of air or oxygen be used. As a guide, an air-blowing rate of about 500–1500 cubic feet per minute is satisfactory with a 275 barrel charge of acid-treated asphalt maintained at 380–400° F. for about two hours.

The temperatures during the oxidation operation are maintained within the range of about 350° F. to about 450° F., preferably at about 380° F. Such temperatures are considerably below those customarily used in the art; normally, temperatures from 450 to 550° F. are required. Temperatures below about 350° F. are unsatisfactory, inasmuch as excessively long blowing times are required. And temperatures above about 400° F. are avoided inasmuch as undesirable features often arise in the products. For example, when temperatures above about 400° F. are used, an appreciable decrease in penetration value is noted; and, in addition, increasing amounts of "carbon tetrachloride-insolubles" are found in the products. It has been found that most advantageous operation is in the range of 370–380° F.

Related to the temperature of the oxidation procedure is the time factor. As a general rule, longer time intervals prevail when the temperature is maintained at about 350° F., and shorter intervals with temperatures at about 400° F. And as a guide the time intervals necessary to make possible obtainment of products of desired grade, are within the range of about 2 hours to about 8 hours, for a 150° F. softening point product. The time factor is also dependent upon the equipment and method of operating the same, particularly with regard to the efficiency with which the air or oxygen is utilized.

ILLUSTRATIVE EXAMPLES

All of the various foregoing features of the products and process of this invention are further revealed by the following illustrative examples.

Effect of phosphoric acid on temperature susceptibility of product

One of the measures of the temperature susceptibility of an asphalt is the ratio of the penetration at one temperature to the penetration at another temperature. Any susceptibility factor based on this ratio means that as the factor approaches unity, the temperature susceptibility is improving. Use can be made of this characteristic to present a rather large amount of data, without resorting to a large number of computations, directly from the experimental data.

When the penetration at one temperature is plotted as a function of the penetration at another temperature, the closer the experimental curve approaches the equal penetration curve (the penetration at one temperature is the same as the penetration at the other temperature) the better the temperature susceptibility.

Data obtained by the blowing of a 27% Kuwait residuum having a softening point of 85° F., with and without pretreatment with phosphoric acid, are shown graphically in Figure 1. All of the examples represented by the data in Figure 1 were carried out with the same Kuwait residuum. In those examples in which phosphoric acid was used, the acid was added to the residuum, which was stirred at 300° F., during a 20–30 minute period. The residuum and acid were agitated, with a small amount of air, for two hours. Then, the temperature was raised to 370–380° F. and blown to the desired grade, while air was blown therethrough at a normal oxidation rate. In the examples in which phosphoric acid was omitted, the residuum was heated at 500° F., approximately the same air rate being used.

In Figure 1, the penetration at 115° F. is plotted as a function of the penetration at 77° F. The curve farthest from the equal penetration curve represents the penetration data on the straight air-blown asphalts. It will be noted, however, that as the penetration decreases the curve approaches the equal penetration curve, and also that blowing improves the temperature susceptibility of these asphalts at a uniform rate. The temperature susceptibility of the asphalt products are shown in Table I below:

TABLE I

| Percent H₃PO₄ | 0 | 0.50 | 0.75 | 1.50 | 3.00 |
|---|---|---|---|---|---|
| When penetration at 77° F.=100 | 6.7 | 5.0 | 4.0 | 3.3 | 2.6 |
| When penetration at 77° F.= 50 | 4.7 | 3.6 | 3.0 | 2.6 | 2.1 |
| When penetration at 77° F.= 10 | 2.0 | 1.75 | 1.60 | 1.50 | 1.35 |

The data in Table I reveal that ordinary air-blowing in itself makes possible improved temperature susceptibility, depending upon the extent of blowing. This is inherent, but limited. The use of phosphoric acid in the manner described herein, however, permits improving the susceptibility of an asphalt at a chosen penetration level, for example 100 at 77° F. The improvement obtained is greater with larger amounts of the acid. Use of the acid does not materially affect the slope of the curves shown in Figure 1, but it does appreciably displace them towards the equal penetration curve.

*Effect of phosphoric acid concentration*

The 27% Kuwait residuum was treated with various amounts of phosphoric acid (85% H₃PO₄), and then air-blown, in the manner described above in connection with data shown in Figure 1.

Figure 4:
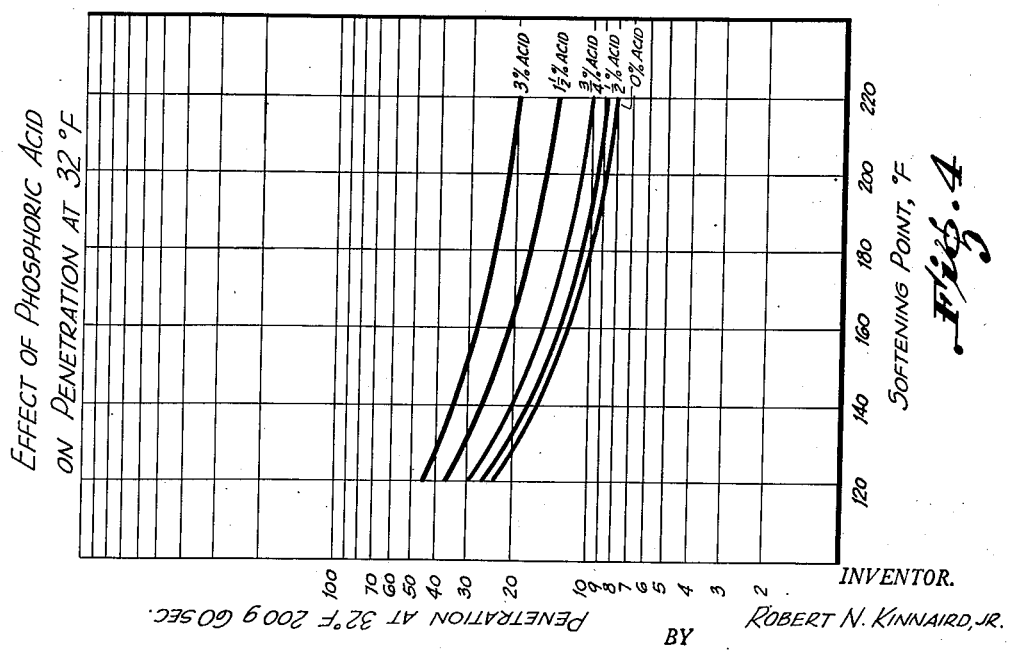

The effect of different amounts of phosphoric acid, as measured by the pentration at 77° F., 100 grams, 5 seconds, on asphalts of different softening points is shown graphically in Figure 2. The curves in this figure show that increasing amounts of acid provide asphalts with increasing penetrations for any given softening point. In Figure 3, the effect of the different amounts of acid on the penetration at 115° F., 50 grams, 3 seconds, is shown; and in Figure 4, the effect of the different amounts of phosphoric acid on the penetration at 32° F., 200 grams, 60 seconds, is shown. As in the case of the penetration at 77° F., the penetrations at these other temperatures show that increasing amounts of phosphoric acid produce asphalts with higher penetrations for any given softening point.

It is to be noted that, with this flux, the greatest effect is obtained with three per cent of the acid.

From curves 2 through 4, the penetration data were found for asphalts with softening points ranging from 120° F. to 220° F. These penetration data are tabulated below in Table II.

TABLE II.—PENETRATIONS OF ASPHALTS OBTAINED FROM KUWAIT FLUX

[Penetration at 77° F., 100 g, 5 sec.]

| Percent Acid | Softening Point, °F. | | | | | |
|---|---|---|---|---|---|---|
| | 120 | 140 | 160 | 180 | 200 | 220 |
| 0 | 85 | 38 | 22 | 15 | 11½ | 9 |
| ½ | 103 | 52 | 31 | 20 | 14½ | 10½ |
| ¾ | 120 | 64 | 40 | 28 | 20½ | 15½ |
| 1 | 125 | 69 | 45 | 32 | 24 | 19 |
| 1½ | 140 | 82 | 54 | 40 | 31 | 24 |
| 2 | 150 | 89 | 61 | 45 | 35 | 29 |
| 3 | 165 | 103 | 74 | 56 | 44 | 36 |

[Penetration at 115° F., 50 g, 5 sec.]

| 0 | 155 | 63 | 39 | 27 | 20 |
| ½ | 185 | 84 | 49 | 33 | 23 |
| ¾ | 210 | 110 | 64 | 41 | 28 |
| 1 | 220 | 120 | 70 | 48 | 34 |
| 1½ | 245 | 137 | 86 | 60 | 43 |
| 2 | 255 | 153 | 100 | 72 | 53 |
| 3 | 275 | 180 | 125 | 92 | 71 |

[Penetration at 32° F., 200 g, 60 sec.]

| 0 | 24 | 16 | 11½ | 9½ | 8½ | 8 |
| ½ | 26 | 17 | 12½ | 10 | 9 | 8½ |
| ¾ | 29 | 20 | 15 | 12 | 11 | 10 |
| 1 | 32 | 23 | 17 | 14 | 12½ | 11 |
| 1½ | 37 | 26 | 20 | 17 | 15 | 13½ |
| 2 | 42 | 30 | 23 | 19½ | 17½ | 16 |
| 3 | 46 | 35 | 28 | 24 | 21 | 19 |

The relationship between the penetration values and the amount of phosphoric acid used, is shown in Figures 5 through 7. These figures show the effect of the various percentages of the acid on the penetration at 77° F., 115° F. and 32° F., respectively. The acid has a uniformly increasing effect for increasing amount. As the slopes of these curves are all less than unity, the effectiveness of each additional increment of acid is less than the preceding increment. For example, the penetration at 77° F. for a 120° F. softening point asphalt is raised by 22 points when the amount of acid is increased from ½% to 1%; whereas, the penetration is raised by only 10 points when the amount of acid is increased from 1½% to 2%.

When the effectiveness of the acid is measured by the penetration (expressed as the percentage of the air blown penetration), it is found that, in most cases, the effectiveness goes through a maximum. In Table III, below, the penetration of the various grades of asphalts obtained by the instant process, is tabulated as the percentage of the corresponding air-blown penetration.

TABLE III.—PERCENTAGE INCREASE IN PENETRATION FOR ACID BLOWN ASPHALTS OBTAINED FROM KUWAIT FLUX

[Penetration at 77° F. as percent of air blown.]

| Percent Acid | Softening Point, °F. | | | | | |
|---|---|---|---|---|---|---|
| | 120 | 140 | 160 | 180 | 200 | 220 |
| ½ | 121 | 137 | 141 | 133 | 126 | 117 |
| ¾ | 141 | 169 | 182 | 187 | 178 | 172 |
| 1 | 147 | 182 | 205 | 213 | 210 | 210 |
| 1½ | 165 | 216 | 246 | 267 | 270 | 267 |
| 2 | 176 | 234 | 277 | 300 | 306 | 322 |
| 3 | 194 | 271 | 336 | 374 | 382 | 400 |

[Penetration at 115° F. as percent of air blown.]

| ½ | | 119 | 133 | 126 | 122 | 115 |
| ¾ | | 135 | 175 | 164 | 152 | 140 |
| 1 | | 142 | 190 | 180 | 177 | 170 |
| 1½ | | 158 | 218 | 220 | 222 | 215 |
| 2 | | 165 | 242 | 256 | 266 | 265 |
| 3 | | 178 | 286 | 320 | 340 | 355 |

[Penetration at 32° F. as percent of air blown.]

|  |  |  |  |  |  |  |
|---|---|---|---|---|---|---|
| ½ | 108 | 106 | 109 | 105 | 106 | 106 |
| ¾ | 121 | 125 | 130 | 126 | 130 | 125 |
| 1 | 133 | 144 | 148 | 147 | 147 | 138 |
| 1½ | 154 | 162 | 174 | 179 | 177 | 169 |
| 2 | 175 | 187 | 200 | 205 | 206 | 200 |
| 3 | 192 | 219 | 244 | 252 | 248 | 238 |

Figure 8:
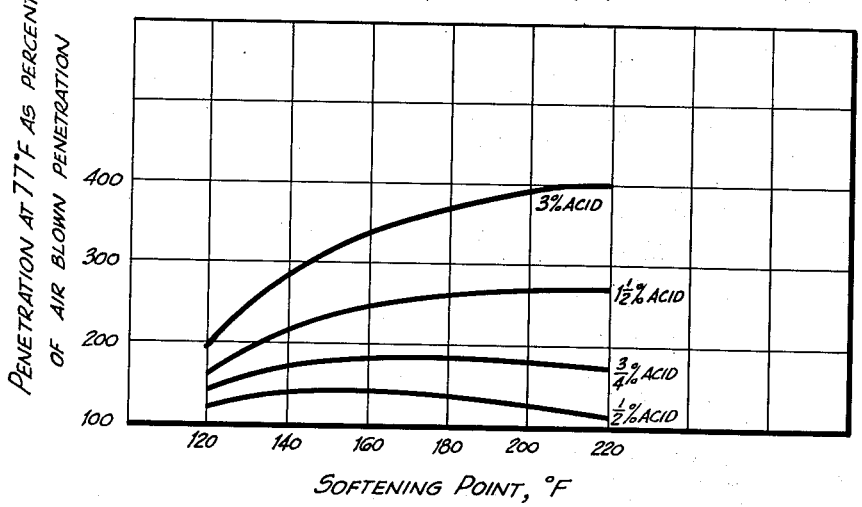
Figure 9:
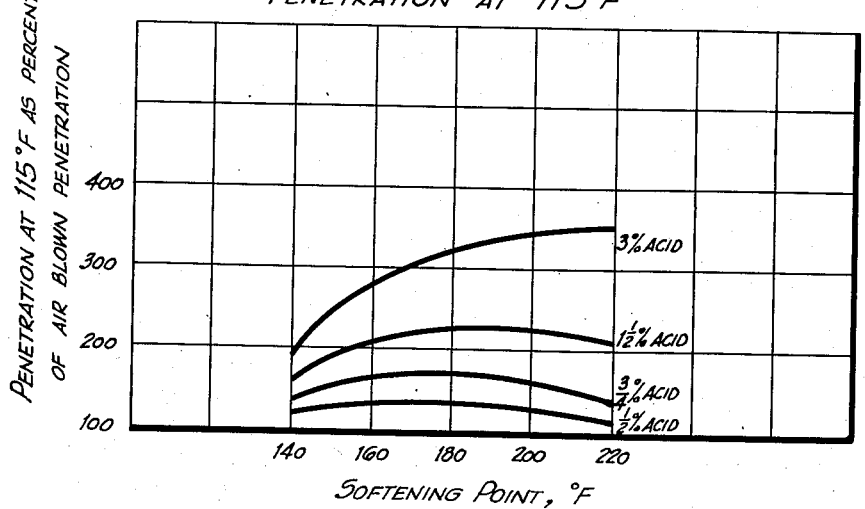
Figure 10:
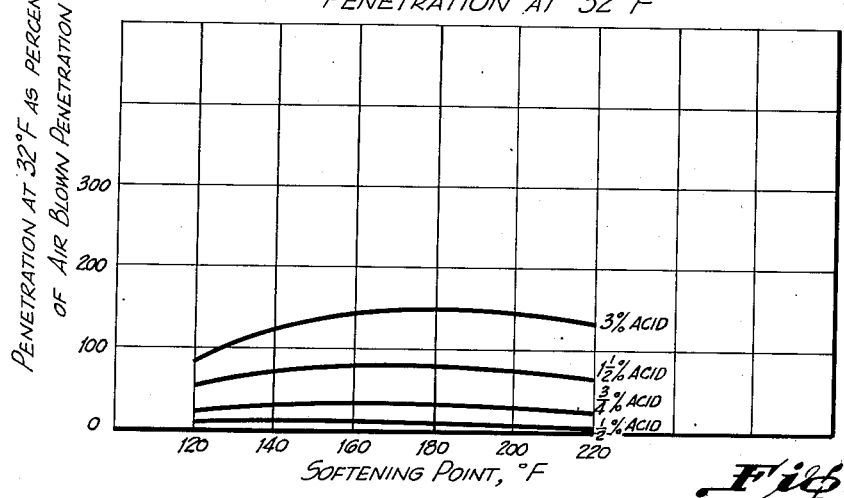

The data in Table III are plotted in Figures 8 through 10. These plots show that the percentage increase in penetration rises with increasing softening point, until a maximum is reached, and then tends to fall off for the still higher softening points. When phosphoric acid was used in an amount of 3%, there was no maximum percentage increase in the penetration at 77° F. and 115° F. in the range examined, although the rate of percentage increase in penetration is rapidly falling off at the higher softening points.

The effect of phosphoric acid on the penetration can be expressed in still another way, that is, expressed by the effect of the acid on the increase in penetration at a given softening point. Tabulated in Table IV, below, is the increase in penetration over the air-blown penetration for asphalts with softening points between 120° F. and 220° F.

TABLE IV.—INCREASE IN PENETRATION OF ACID BLOWN ASPHALTS OBTAINED FROM KUWAIT FLUX

[Increase at 77° F.]

| Percent Acid | Softening Point, °F. | | | | | |
|---|---|---|---|---|---|---|
|  | 120 | 140 | 160 | 180 | 200 | 220 |
| ½ | 18 | 14 | 9 | 5 | 3 | 1½ |
| ¾ | 35 | 26 | 12 | 13 | 9 | 6½ |
| 1 | 40 | 31 | 23 | 17 | 12½ | 10 |
| 1½ | 55 | 44 | 32 | 25 | 19½ | 15 |
| 2 | 65 | 51 | 39 | 30 | 23½ | 20 |
| 3 | 80 | 65 | 52 | 41 | 32½ | 27 |

[Increase at 115° F.]

| | | | | | | |
|---|---|---|---|---|---|---|
| ½ |  | 30 | 21 | 10 | 6 | 3 |
| ¾ |  | 55 | 47 | 25 | 14 | 8 |
| 1 |  | 65 | 57 | 31 | 21 | 14 |
| 1½ |  | 90 | 74 | 47 | 33 | 23 |
| 2 |  | 100 | 90 | 61 | 45 | 33 |
| 3 |  | 120 | 117 | 86 | 65 | 51 |

[Increase at 32° F.]

| | | | | | | |
|---|---|---|---|---|---|---|
| ½ |  | 2 | 1 | 1 | ½ | ½ | ½ |
| ¾ |  | 5 | 4 | 3½ | 2½ | 2½ | 2 |
| 1 |  | 8 | 7 | 5½ | 4½ | 4 | 3 |
| 1½ |  | 13 | 10 | 8½ | 7½ | 6½ | 5½ |
| 2 |  | 18 | 14 | 11½ | 10 | 9 | 8 |
| 3 |  | 22 | 19 | 16½ | 14½ | 12½ | 11 |

Figure 11:
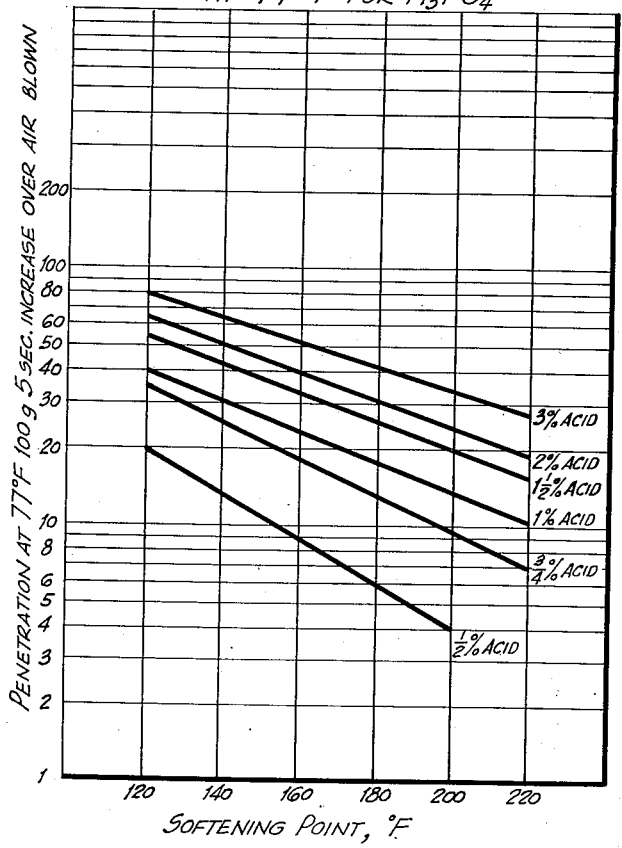
Figure 13:
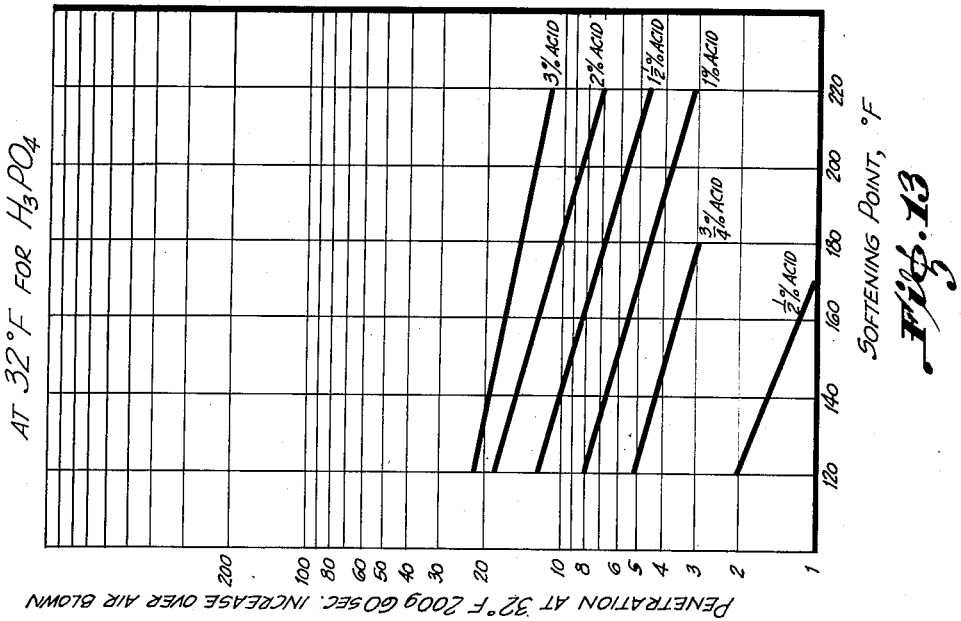
Figure 12:
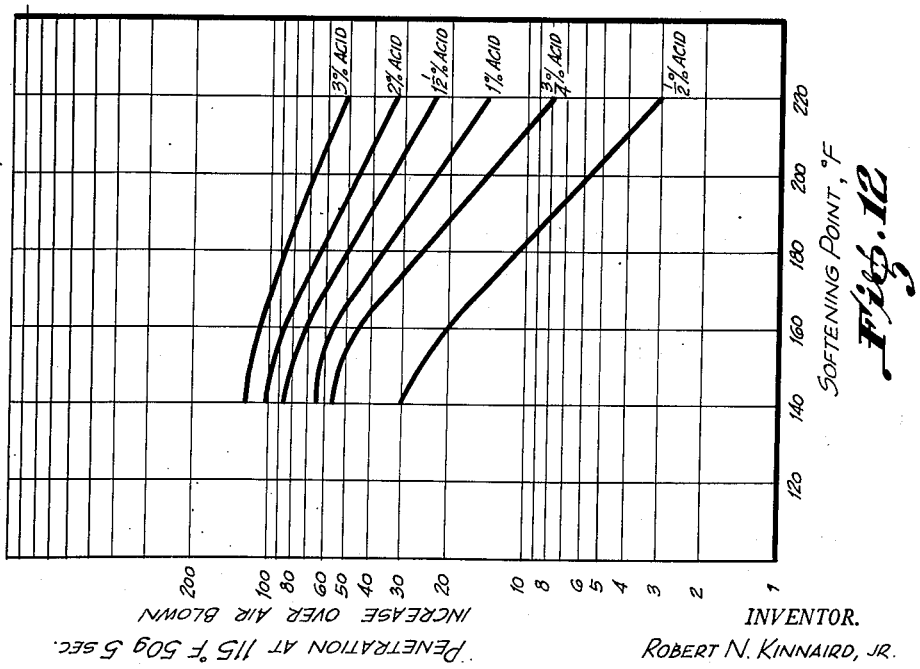

It is to be noted, from the data in Table IV, that the greatest increase in penetration for any temperature of test is for those asphalts blown with the greatest amount of phosphoric acid. It is also to be noted that the greatest effect on any increment of acid is on those asphalts with the lowest softening point. This effect is presented graphically in Figures 11 through 13, wherein it is shown that the action of the acid changes in a uniform manner over the range examined, except for the penetration at 115° F. on asphalts having softening points less than 160° F.

*Effect of blowing temperature on effectiveness of phosphoric acid*

The effect of different blowing temperatures was determined by treating a 24% Kuwait residuum, having a 90° F. softening point. Several comparable runs were made at the following blowing temperatures:

Run 1, 500° F. _____ No acid
Run 2, 380° F. _____ 2% acid
Run 3, 430° F. _____ 2% acid
Run 4, 480° F. _____ 2% acid In these runs, the acid was added to the charge when the temperature of the charge was at 300° F. In runs 2 through 4, the acid was added over a period of 20 to 30 minutes; and in run 4 only, the acid-treated charge was agitated at 300° F. for 2 hours before the temperature was increased and before air blowing was commenced.

The penetration values at 77° F., obtained from runs 1 through 4, are plotted in Figure 14. Run 2, made at 380° F., provided asphalts of the highest penetration. The asphalts obtained at 430° F. (Run 3) reveal an appreciable drop in penetration. Similarly, asphalts obtained at 480° F. (run 4) exhibit a slightly further decrease in penetration values. It appears most likely that a further decrease in penetration values would be shown, had the acid-treated charge in Run 4 been immediately air-blown following addition of the acid to the charge.

In addition to the increased effectiveness of the acid at lower blowing temperatures on the penetration values, it has been found that the lower blowing temperatures make asphalts having but little "carbon tetrachloride-insoluble matter" as contaminants therein.

*Effect of phosphoric acid on "carbontetrachloride insolubles"*

Phosphoric acid, when used under certain operating conditions, causes an abnormally large amount of "carbon tetrachloride-insoluble material" to be formed. It has been found, however, that the insoluble material can be minimized by following the procedure of this invention.

The influence of the operating procedure on the insoluble material in the asphalt products is demonstrated by the following runs:

| | | | Blowing Temp., °F. |
|---|---|---|---|
| Run 5 | Casper, 85° F., S. P. Flux | No Acid | 380 |
| Run 6 | Casper, 85° F., S. P. Flux | 2% Acid | 380 |
| Run 7 | Casper, 85° F., S. P. Flux | 2% Acid | 430 |
| Run 8 | Kuwait, 85° F., S. P. Flux | No Acid | 500 |
| Run 9 | Kuwait, 85° F., S. P. Flux | 2% Acid | 380 |
| Run 10 | Kuwait, 85° F., S. P. Flux | 2% Acid | 430 |
| Run 11 | Kuwait, 85° F., S. P. Flux | 2% Acid | 480 |
| Run 12 | Kuwait, 85° F., S. P. Flux | 3% Acid | 380 |

Runs 7, 11 and 12 were made by adding the acid to the flux over a period of 20 to 30 minutes, while agitating the flux and maintaining the temperature of the flux at 300° F. This was followed by a period of two hours at 300° F. during which the flux and acid were agitated; thereafter, the flux was air-blown at the designated blowing temperature. Agitation was provided by a mechanical stirring means, assisted by a small amount of air blown through the acid-flux mixture. The desired rate and quantity of air for blowing purposes, were not used until the charge was brought up to the blowing temperature. Runs 5 and 8 were straight air-blown at 380° F. and 500° F., respectively. Runs 6, 9 and 10 were made by adding the acid to the flux at 325° F., 300° F. and 300° F., respectively, over a period of 20 to 30 minutes, while agitating the flux; thereafter the flux was air-blown at the designated blowing temperature.

Data on the insoluble matter in the blown asphalts obtained from the Casper 85° F. S. P. flux are shown graphically in Figure 15. The straight air-blown asphalts have a total of 0.40%–0.50% of material insoluble in carbon tetrachloride. When 2% of phosphoric acid was present during the blowing operation, the insoluble material increased to 3.2–4.4%. When the acid and flux were agitated for two hours, following complete addition of acid and prior to air-blowing, the insoluble matter was only 1.1–1.4%, even though the blowing temperature was 430° F.

Figure 16:
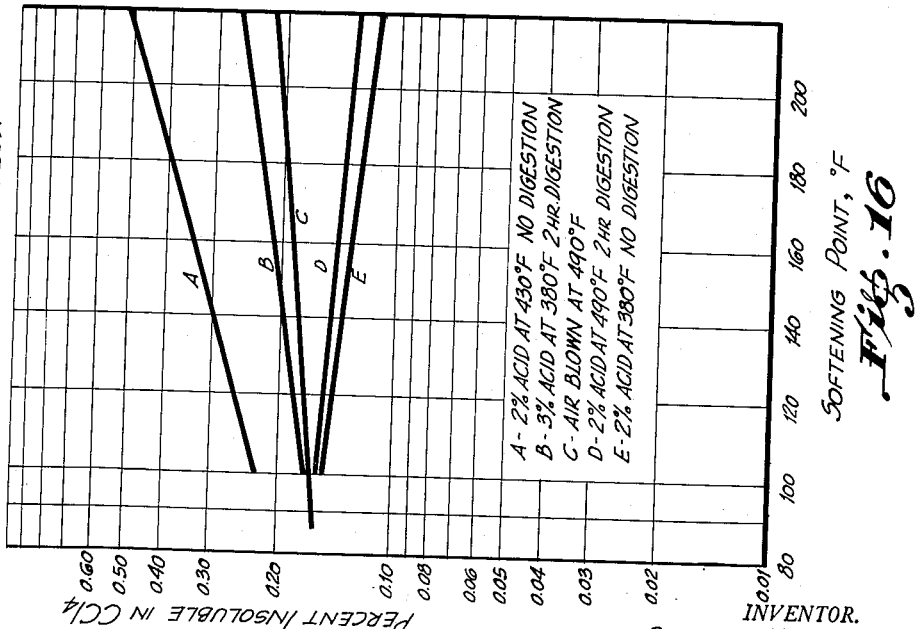

The Runs made with the Kuwait residuum reveal that this flux is less susceptible to the formation of insolubles. Figure 16 is a graphical representation of the insolubles, found in the products from the Kuwait flux. The straight air-blown asphalts have an insoluble fraction of from 0.16–0.21%. When the flux was blown with acid present at 430° F., the insolubles increased to 0.22–0.50%. Reduction of the blowing temperature to 380° F., with acid present, led to a reduction in insolubles, to 0.11–0.15%. When the acid and flux were maintained at 300° F. for two hours, before the blowing procedure, the insolubles were 0.13–0.16% even though the blowing temperature was raised to 490° F. The presence of 3% of acid, and inclusion of the two hour treating period at 300° F., raised the insolubles to 0.17–0.26%.

As indicated, therefore, fluxes of different origin exhibit somewhat different behavior when subjected to blowing in the presence of phosphoric acid. This is demonstrated by the high amount of insoluble matter obtained with the Casper flux having a softening point of 85° F. By way of comparison, the asphalt products obtained from the Kuwait flux, also having a softening point of 85° F., contained lesser quantities of insolubles.

*Comparison of Burk 2,179,208, and Hoiberg 2,450,756, processes and products, with new process and products*

As indicated hereinabove, Burk has described the use of phosphoric acid in preparing asphalts. In the Burk process, a residuum is air-blown immediately with phosphoric acid present or, as an alternative procedure, the acid is added to an air-blown residuum. Hoiberg describes air-blowing in the presence of $P_2O_5$. In contrast, the present process has the distinctive feature of acid addition followed by air-blowing. The surprising differences obtaining between the asphalts prepared by the two procedures are revealed by the following comparative examples. In all cases, a Casper flux, having a softening point of 85° F., was used.

Run 13: No acid was used; heated to 380° F., then air-blown at 380° F. until the desired grade was obtained.
Run 14: Flux heated to 380° F., then air-blown at 380° F.; then 2% of $H_3PO_4$ was added, and heated at 300° F. for two hours. (Burk process)
Run 15: Flux heated to 380° F., then 2% of $H_3PO_4$ added with simultaneous air-blowing; air-blowing continued at 380° F. until the desired grade was obtained. (Hoiberg process, with $H_3PO_4$ replacing $P_2O_5$)
Run 16: Flux heated to 300° F., then 2% $H_3PO_4$ added; acid and flux maintained at 300° F. for two hours; then air-blown at 380–430° F. until the desired grade was obtained.

Softening point-penetration data characterizing the asphalt products of Runs 13 through 16 are set forth in Table V. Such data reveal that the Burk procedure is an improvement over straight air-blowing without phosphoric acid (comparison of Runs 13 and 14). However, the improvement is appreciably less than that realized by the novel process of this invention (comparison of Runs 13, 14 and 16). The differences between the softening point-penetration values of the products obtained with Burk's procedure and those obtained with the new procedure, are significant because specifications established for waterproofing grades of asphalts are not satisfied by products obtained by following the earlier procedure, and are satisfied by the novel products of this invention.

Figure 17:
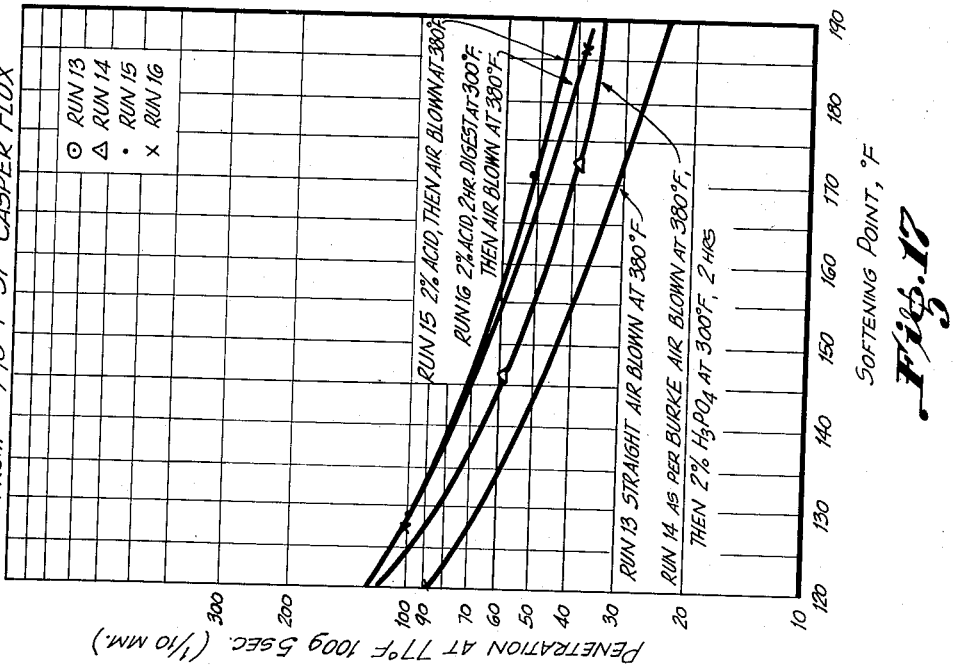
Figure 18:
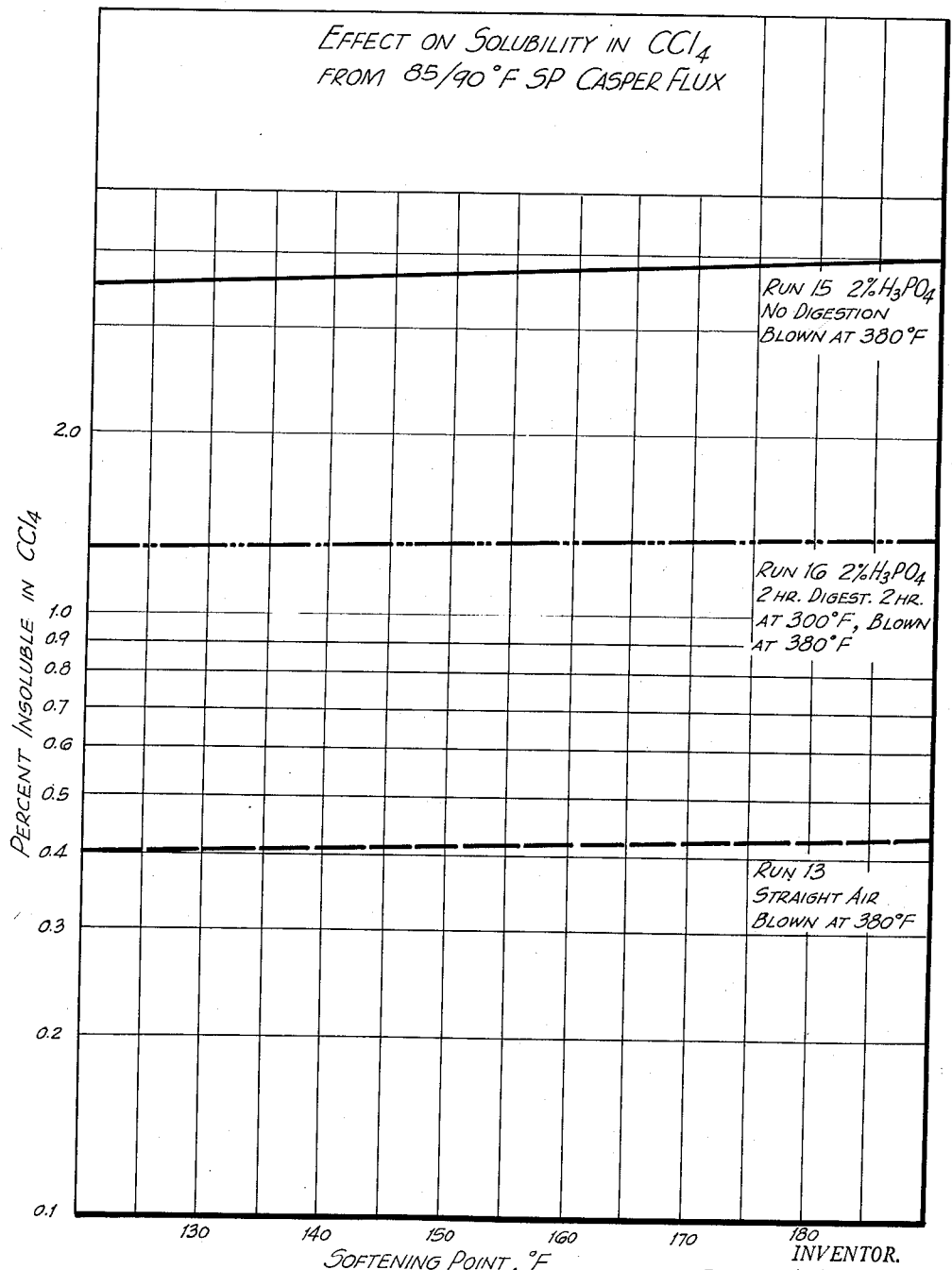

Comparison of the products obtained following the Hoiberg procedure, with those obtained with the new procedure, is provided by data shown in Figures 17 and 18. In Figure 17, softening point-penetration data reveal a superiority of the new products characterized by softening points in the range of 170° F. and greater. Figure 18 provides a striking, graphic showing of "carbon tetrachloride-insolubles" and softening point values. As revealed by Figure 18, the amount of insoluble matter characterizing the products of Run 15 (Hoiberg process) are excessively high, much higher than the amounts obtained by Run 16 (Novel process) and by Run 13 (straight air-blowing).

In addition to the data presented in the form of curves in Figures 17 and 18, the following tabulation, Table V, is provided in order to offer a convenient form of comparison of asphalts blown from the Casper flux to the same softening point of 165° F.

TABLE V

|  | Original Flux | Run 13 | Run 14 (Burk) | Run 15 (Hoiberg) | Run 16 |
|---|---|---|---|---|---|
| $H_3PO_4$, Wt. percent | | 0 | 2 | 2 | 2 |
| Pretreatment with $H_3PO_4$, hrs. @ °F | | 0 | ¹ 0/300 | 0 | 2/300 |
| Blowing Temp., °F | | 380 | 380 | 380 | 380–430 |
| S. P., Percent F. (Ring and Ball Method) | 88 | 165 | 165 | 165 | 165 |
| Penetration, @ 77° F./100 g./5 secs | | 34 | 44 | 55 | 53 |
| $CCl_4$ Insolubles, Wt. Percent | | 0.42 | 0.48 | 3.80 | 1.35 |

¹ After Treat.

UTILITY

As an example of the utility of the asphalts obtained, an asphalt having a 160° F.–175° F. softening point and a 50–60 penetration at 77° F., 100 grs., 5 sec., is required for cable coatings. The straight air-blown Casper flux produced an asphalt with a 29–37 penetration at 77° F., 100 grs., 5 sec., which is too hard. When following the procedure shown by Burk, a 39–47 penetration at 77° F., 100 grs., 5 sec., was obtained, which likewise is too hard for this purpose. When, however, my procedure is used a 46–58 penetration at 77° F., 100 grs., 5 sec., was obtained thereby fulfilling the requirement for this asphalt. Additional examples of utility are: roofing fluxes, mop coating asphalts, laminating asphalts for paper, culvert pipe coatings, canal linings and battery sealers.

I claim:

1. The process for preparing an asphalt which comprises: (1) treating an asphalt charge stock with a relatively small amount, from about 1/10 to about 10 per cent by weight of the asphalt charge stock, of phosphoric acid, at a temperature from about 200° F. to about 350° F. for a period of time from 4 hours to about ½ hour; and (2) oxidizing the product obtained in (1), at a temperature from about 350° F. to about 450° F. until the desired softening point is obtained.

2. The process as defined by claim 1 where the asphalt charge stock is a Casper flux having a softening point of about 85° F.

3. The process as defined by claim 1 wherein the temperature and time of operation (1) are 300° F. and two hours, respectively.

4. The process as defined by claim 1 wherein the temperature and time of operation (2) are 380° F. and two hours, respectively.

5. The process for preparing an asphalt, which comprises: (1) treating an asphalt charge stock with about three per cent by weight, of said charge stock, of phosphoric acid, at a temperature of about 300° F. for about 2 hours; and (2) air-blowing the product obtained in (1), at a temperature of about 380° F. for about 2 hours.

6. An asphalt obtained by: (1) treating an asphalt charge stock with a relatively small amount, from about 1/10 to about 10 per cent by weight of the asphalt charge stock, of phosphoric acid, at a temperature from about 200° F. to about 350° F. for a period of time from about 4 hours to about 1/2 hour; and (2) oxidizing the product obtained in (1), at a temperature from about 350° F. to about 450° F. until a product having the desired softening point is obtained.

References Cited in the file of this patent

UNITED STATES PATENTS

| | | |
|---|---|---|
| 2,026,073 | Swerissen | Dec. 31, 1935 |
| 2,179,208 | Burk et al. | Nov. 7, 1939 |
| 2,450,756 | Hoiberg | Oct. 5, 1948 |
| 2,488,293 | Hoiberg | Nov. 15, 1949 |
| 2,640,803 | Illman et al. | June 2, 1953 |
| 2,676,910 | Edson | Apr. 27, 1954 |